United States Patent
Jun et al.

(10) Patent No.: US 10,841,659 B2
(45) Date of Patent: Nov. 17, 2020

(54) VIDEO ENCODING APPARATUS AND VIDEO ENCODING SYSTEM

(71) Applicant: Samsung Electronics Co., Ltd., Gyeonggi-do (KR)

(72) Inventors: Sung Ho Jun, Hwaseong-si (KR); Yo Won Jeong, Anyang-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 32 days.

(21) Appl. No.: 15/866,959

(22) Filed: Jan. 10, 2018

(65) Prior Publication Data

US 2019/0069033 A1 Feb. 28, 2019

(30) Foreign Application Priority Data

Aug. 29, 2017 (KR) .................. 10-2017-0109458

(51) Int. Cl.
| | |
|---|---|
| H04N 21/4728 | (2011.01) |
| G06T 3/40 | (2006.01) |
| H04N 7/01 | (2006.01) |
| H04N 19/10 | (2014.01) |
| H04N 21/472 | (2011.01) |
| H04N 21/8545 | (2011.01) |
| H04N 21/4402 | (2011.01) |
| H04N 19/46 | (2014.01) |
| H04N 19/162 | (2014.01) |
| H04N 19/17 | (2014.01) |

(52) U.S. Cl.
CPC ........... *H04N 21/4728* (2013.01); *G06T 3/40* (2013.01); *H04N 7/0117* (2013.01); *H04N 19/10* (2014.11); *H04N 19/162* (2014.11); *H04N 19/17* (2014.11); *H04N 19/46* (2014.11); *H04N 21/440245* (2013.01); *H04N 21/47205* (2013.01); *H04N 21/8545* (2013.01)

(58) Field of Classification Search
CPC .. G06T 3/40; H04N 19/10; H04N 21/440245; H04N 21/47205; H04N 21/4728; H04N 21/8545; H04N 7/0117
See application file for complete search history.

(56) References Cited

U.S. PATENT DOCUMENTS

| | | | |
|---|---|---|---|
| 7,630,567 B2 | 12/2009 | Fukushima et al. | |
| 9,554,085 B2 * | 1/2017 | Iyer | G06F 3/013 |
| 2009/0052537 A1 | 2/2009 | Burazerovic et al. | |
| 2011/0235706 A1 | 9/2011 | Demircin et al. | |
| 2016/0100166 A1 | 4/2016 | Dragne et al. | |
| 2017/0150148 A1 * | 5/2017 | Zhang | H04N 19/176 |
| 2019/0320189 A1 * | 10/2019 | Cooper | H04N 19/115 |

FOREIGN PATENT DOCUMENTS

| | | |
|---|---|---|
| JP | 2010/256536 A | 11/2010 |
| JP | 4863937 B2 | 1/2012 |
| JP | 2013/073309 A | 4/2013 |

* cited by examiner

*Primary Examiner* — Farzana Hossain
(74) *Attorney, Agent, or Firm* — Harness, Dickey and Pierce, P.L.C.

(57) ABSTRACT

A video encoding apparatus may include a memory storing interest region information for each of a plurality of scenarios and a neural processing unit (NPU) extracting interest region information corresponding to a scenario of an input video from the memory or updating the interest region information stored in the memory based on an user input.

11 Claims, 9 Drawing Sheets

Scenario 1

VIDEO ENCODING APPARATUS AND VIDEO ENCODING SYSTEM

This application claims priority from Korean Patent Application No. 10-2017-0109458 filed on Aug. 29, 2017 in the Korean Intellectual Property Office, the disclosure of which is incorporated herein by reference in its entirety.

BACKGROUND

1. Technical Field

Example embodiments relates to a video encoding apparatus and/or a video encoding system.

2. Description of the Related Art

There is an increasing demand for high-resolution and high-quality images such as high definition (HD) images and ultra-high definition (UHD) images, and high-performance image compression techniques are being used to process high-resolution and high-quality images.

Recently, mobile appliances such as mobile phones and smart phones have been widely used, and studies have been made on various methods for efficiently compressing high-resolution and high-quality images in a mobile appliance having a limited environment such as a small size and a battery usage.

In particular, recently, in order to encode an input image, in a video encoding system, there have been widely used many techniques of dividing the frame in an image into a region of interest and a non-region of interest and differently assigning the number of bits to the region of interest and the non-region of interest.

However, despite the fact that region of interest may be changed for each user, according to recent technology trends, the region of interest and the non-region of interest may be defined in the image using the same criteria.

SUMMARY

Accordingly, at least some example embodiments are directed to a method of differently setting a region of interest according to a scenario of a video.

At least some other example embodiments are directed to a method of setting an region of interest by allowing a user to recognize the region of interest.

Still at least some other example embodiments are directed to a method of updating an region of interest based on the input of a user.

However, example embodiments are not restricted to the one set forth herein. The above and other aspects of the example embodiments will become more apparent to one of ordinary skill in the art by referencing the detailed description given below.

According to an example embodiment, a video encoding apparatus may include a memory configured to store interest region information for each of a plurality of scenarios; and a processor configured to perform one or more of, extracting the interest region information corresponding to a scenario of the plurality of scenarios, the scenario being associated with an input video received from the memory, and updating the interest region information stored in the memory based on a user input.

According to an example embodiment, a video encoding apparatus may include a memory configured to store interest region information for each of a plurality of scenarios; and a processor configured to, extract, from the memory, the interest region information corresponding to a scenario associated with an input video by analyzing the scenario, divide a current frame included in the input video into a plurality of blocks, divide the plurality of blocks into a first block corresponding to a region of interest and a second block corresponding to a non-region of interest based on the interest region information, determine a first quantization parameter value for the first block and a second quantization parameter value for the second block, and encode the current frame based on the first quantization parameter value and the second quantization parameter value to generate compressed data.

According to an example embodiment, a video encoding system may include a video source, a video encoding apparatus including a first memory and a processor, and a second memory. The video source may be configured to transmit an input video. The first memory of the video encoding apparatus may be configured to store interest region information for each of a plurality of scenarios, and the processor of the video encoding apparatus may be configured to, extract, from the first memory, the interest region information corresponding to the scenario associated with the input video, divide a current frame included in the input video into a plurality of blocks, divide the plurality of blocks into a first block corresponding to a region of interest and a second block corresponding to a non-region of interest based on the interest region information, determine a first quantization parameter value for the first block and a second quantization parameter value for the second block, and encode the current frame based on the first quantization parameter value and the second quantization parameter value to generate compressed data. The second memory may be configured to store a bit stream, the bit stream being entropy-encoded based on the compressed data.

However, example embodiments are not restricted to the one set forth herein. The above and other aspects of the example embodiments will become more apparent to one of ordinary skill in the art by referencing the detailed description of the inventive concepts given below.

BRIEF DESCRIPTION OF THE DRAWINGS

The above and other aspects and features of the example embodiments will become more apparent by describing in detail some example embodiments thereof with reference to the attached drawings, in which.

DETAILED DESCRIPTION

In video encoding systems according to some example embodiments, the region of interest of a user may be recognized for each input video scenario through a pretest to reflect this recognized region of interest at the time of video encoding, and the region of interest may be updated for each scenario by analyzing and learning the behavior pattern of a user based on a user input at the time of displaying an image. Hereinafter, some example embodiments will be described with reference to the attached drawings.

Figure 1:
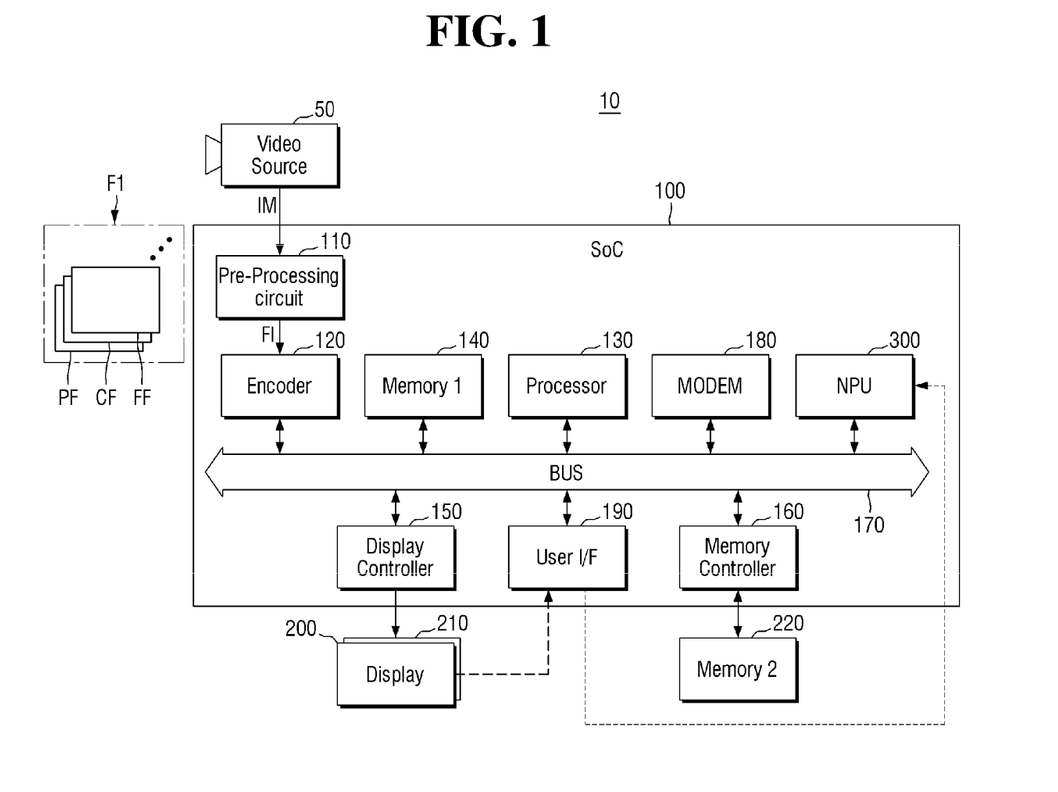
FIG. 1 is a block diagram illustrating a video encoding system according to an example embodiment.

FIG. 1 is a block diagram illustrating a video encoding system according to an example embodiment.

Referring to FIG. 1, a video encoding system 10 may be various systems capable of processing 2D or 3D graphic data and displaying the processed data.

For example, the video encoding system 10 may be realized as one of TV, digital TV (DTV), internal protocol TV (IPTV), a personal computer (PC), a desk-top computer, a lap-top computer, a computer workstation, a tablet PC, a video game platform (or video game console), a server, and a mobile computing apparatus. Here, the mobile computing device may be realized as a mobile phone, a smart phone, an enterprise digital assistant (EDA), a digital still camera, a digital video camera, a portable multimedia player (PMP), a personal navigation device or portable navigation device (PND), a mobile internet device (MID), a wearable computer, an Internet of Things (IOT) device, an Internet of Everything (IOE) device, or an e-book.

The video encoding system 10 may include a video source 50, a video encoding apparatus 100, a display 200, an input device 210, and a second memory 220. However, example embodiments are not limited thereto, and, thus, the video encoding system 10 may have more or fewer components than the components listed above. Here, the video encoding apparatus 100 may be configured as a system on chip (SoC).

The video source 50 may be implemented, for example, as a camera equipped with a CCD or CMOS image sensor. The video source 50 may photograph a subject, generate first data IM for the subject, and provide the generated first data IM to the video encoding apparatus 100. The first data IM may be still image data or moving image data. In some other example embodiments, the video source 50 may be included in a host. In this case, the first data IM may be image data provided from the host.

The video encoding apparatus 100 may control the operation of the video encoding system 10 as a whole. For example, the video encoding apparatus may include an integrated circuit (IC), a mother board, and an application processor (AP) or a mobile AP, which can perform the operations according to some embodiments. The video encoding apparatus 100 may process the first data IM output from the video source 50, and display the processed data through the display 200, store the processed data in the second memory 220 and/or transmit the processed data to another data processing system.

The video encoding apparatus 100 may include a pre-processing circuit 110, an encoder 120, a processor 130, a first memory 140, a display controller 150, a memory controller 160, a bus 170, a modem 180, a user interface 190, and a neural processing unit (NPU) 300. However example embodiments are not limited thereto, and, thus, the video encoding system 10 may have more or fewer components than the components listed above.

The encoder 120, the processor 130, the first memory 140, the display controller 150, the memory controller 160, the modem 180, the user interface 190 and the NPU 300 may receive data from each other and transmit data to each other through the bus 170. Illustratively, the bus 170 may be realized as at least one selected from a peripheral component interconnect (PCI) bus, a PCI express (PCIe), an advanced microcontroller bus architecture (AMBA), an advanced high performance bus (AHB), an advanced peripheral bus (APB), an advanced extensible interface (AXI) bus, and combinations thereof.

The pre-processing circuit 110 may receive the first data IM output from the video source 50. The pre-processing circuit 110 may process the received first data IM, and may provide second data FI generated according to processing results to the encoder 120. In an environment in which the video encoding apparatus 100 is driven, the first data IM and the second data FI may be provided in a unit of frame (or picture).

For example, the second data FI may be a data set including past frame (PF) data, current frame (CF) data, and future frame (FF) data based on a specific time point. Hereinafter, for the convenience of explanation, a description will be limited to a case of encoding the current frame (CF) data included in the second data FI.

The pre-processing circuit 110 may include an image signal processor (ISP). For example, the ISP may convert the first data IM having a first data format into the second data FI.

For example, the first data IM may be data having a Bayer pattern, and the second data FI may be YUV data, but example embodiments are not limited thereto.

Although it is shown in FIG. 1 that the pre-processing circuit 110 is provided in the video encoding apparatus 100, example embodiments are not limited thereto, and the pre-processing circuit 110 may be provided outside the video encoding apparatus 100.

The encoder 120 may divide the current frame CF included in the second data FI into a plurality of blocks, and may perform the encoding operation for each of the plurality of blocks.

The encoding operation may use an image data coding technology such as JPEG (Joint Picture Expert Group), MPEG (Motion Picture Expert Groups), MPEG-2, MPEG-4, VC-1, H. 264, H. 265, or HEVC (High Efficiency Video Coding), but example embodiments are not limited thereto.

The encoder 120 may be implemented as a hardware codec or a software codec. The software codec may be executed by the processor 130.

The processor 130 may control the operation of the video encoding apparatus 100.

While as discussed below, in some example embodiments. the each of the elements of the SoC 100 may be discrete hardware circuits, in other example embodiments, the processor 130 may be configured, through a layout design or execution of computer readable instructions stored in the memory, as a special purpose computer to perform the functions of one or more of the pre-processing circuit 110, the encoder 120, the display controller 150, the memory controller 160, and the neural processing unit (NPU) 300. For example, the processor 130 may be configured to extract interest region information corresponding to a scenario of a plurality of scenarios such that the scenario is associated with an input video received from the memory 140, and/or may be configured to update the interest region information stored in the memory 140 based on a user input received from the user I/F 190.

In view of the above, the special purpose processor 130 may improve the functioning of the video encoding system 10 itself by storing images perceived by a human eyes as the best quality image for each of the plurality of scenarios.

The processor 130 may include any processing circuitry. The processing circuitry may be, but not limited to, a processor, Central Processing Unit (CPU), a controller, an arithmetic logic unit (ALU), a digital signal processor, a microcomputer, a field programmable gate array (FPGA), an Application Specific Integrated Circuit (ASIC), a System-on-Chip (SoC), a programmable logic unit, a microprocessor, or any other device capable of performing operations in a defined manner.

The processor 130 may receive a user input so as to one or more applications (for example, software applications).

Some of the applications executed by the processor 130 may be video call applications. The applications executed by the processor 130 may include, but are not limited to, an operating system (OS), a word processor application, a media player application, video game application, and/or a graphic user interface (GUI) application.

The first memory 140 may store interest region information corresponding to each of a plurality of scenarios used in image encoding.

The plurality of scenarios may be, for example, information indicating the type of objects included in the image, the date on which an image was photographed, the time at which an image was photographed, and the like. The interest region information may be information that divides the plurality of blocks included in the current frame CF into blocks corresponding to an region of interest and blocks corresponding to a non-region of interest.

Under the control of the memory controller 160, the first memory 140 may transmit the interest region information corresponding to the scenario of an input image to the encoder 120.

Under the control of the encoder 120 or the processor 130, the memory controller 160 may write data encoded in the encoder 120 or data output from the processor 130 to the second memory 220.

The first memory 140 may be implemented as volatile memory such as SRAM (Static Random Access Memory). The volatile memory may be implemented as RAM (random access memory), SRAM (static RAM), DRAM (dynamic RAM), SDRAM (synchronous DRAM), T-RAM (thyristor RAM), Z-RAM (zero capacitor RAM), or TTRAM (Twin Transistor RAM). However, example embodiments are not limited thereto, and the first memory 140 may also be implemented as nonvolatile memory.

The second memory 220 may be implemented as nonvolatile memory. The nonvolatile memory may be implemented as electrically erasable programmable read-only memory (EEPROM), flash memory, magnetic RAM (MRAM), spin-transfer torque MRAM, ferroelectric RAM (FeRAM), phase change RAM (PRAM), or RRAM (resistive RAM). Further, the nonvolatile memory may be implemented as multimedia card (MMC), embedded MMC (eMMC), universal flash storage (UFS), solid state drive (SSD), USB flash drive, or hard disk drive (HDD). However, example embodiments are not limited thereto, and the second memory 220 may also be implemented as volatile memory.

Although it is shown in FIG. 1 that the second memory 220 is provided outside the video encoding apparatus 100, example embodiments are not limited thereto, and the second memory 220 may be provided in the video encoding apparatus 100.

The display controller 150 may transmit the data output from the encoder 120 and/or the processor 130 to the display 200. The display 200 may be implemented as a monitor, a TV monitor, a projection device, a thin film transistor liquid crystal display (TFT-LCD), a light emitting diode (LED) display, an organic LED (OLED) display, an active-matrix OLED (AMOLED) display, or a flexible display.

For example, the display controller 150 may transmit data to the display 200 through a Mobile Industry Processor Interface (MIPI) display serial interface (DSI).

The input device 210 may receive a user input, and may transmit an input signal generated by user operation to the user interface 190.

The input device 210 may be implemented as a touch panel, a touch screen, a voice recognizer, a camera, a touch pen, a keyboard, a mouse, or a track point, but example embodiments are not limited thereto. For example, when the input device 210 is a touch screen, the input device 210 may include a touch panel and a touch panel controller. Further, when the input device 210 is a camera, the input device 210 may include an eye recognition sensor. The input device 210 may be configured to be connected with the display 200 or to be separated from the display 200.

The input device 210 may transmit an input signal to the user interface 190.

The user interface 190 may receive the input signal from the input device, and may transmit data generated by the input signal to the processor 130.

Further, the user interface 190 may receive the input signal from the input device, and may transmit information included in the input signal to the NPU 300.

The modem 180 may output data encoded by the encoder 120 and/or the processor 130 to outside the video encoding apparatus 100 using a wireless communication technology. The modem 180 may employ a WI-FI method, WIBRO, a 3G wireless communication method, a long term evolution (LTE™) method, a long term evolution-advanced (LTE-A) method, a broadband LTE-A method, or the like.

The neural processing unit (NPU) 300 may recognize the scenario of an input video provided through the video source 50. For example, the NPU 300 may recognize the scenario of an input video by analyzing the input video.

The NPU 300 may extract the interest region information corresponding to the recognized scenario from the first memory 140. Further, the NPU 300 may update the interest region information stored in the first memory 140 based on the user input.

In FIG. 1, the NPU 300 is illustrated as a separate component, but example embodiments are not limited thereto. For example, the encoder 120 and/or the processor 130 may perform the functions of the NPU 300. Further, the NPU 300 may be included as a component in the video encoding apparatus 100 or may exist outside the video encoding apparatus 100.

Figure 2:
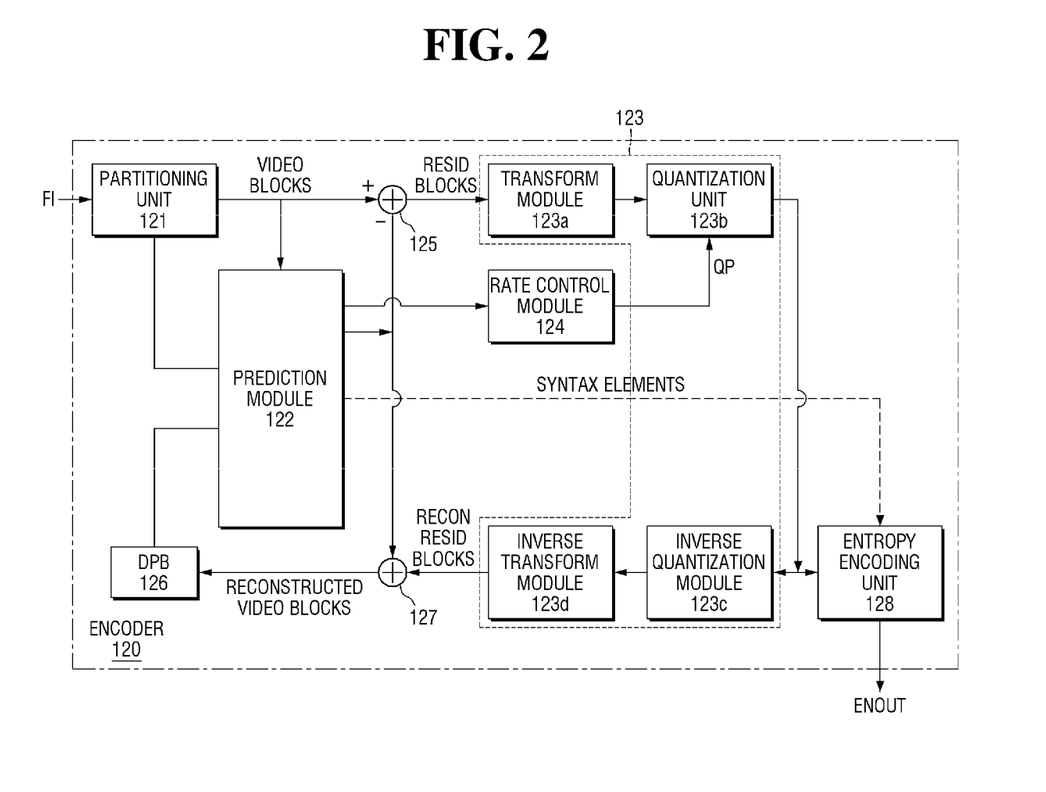
FIG. 2 is a block diagram of an example of an encoder included in the video encoding system shown in FIG. 1.

FIG. 2 is a block diagram of an example of the encoder included in the video encoding system shown in FIG. 1.

Referring to FIG. 2, the encoder 120 may include a partitioning unit 121, a prediction module 122, a compression module 123, a rate control module 124, a decoding picture buffer (DPB) 126, adders 125 and 127, and an entropy encoding unit 128. However, example embodiments are not limited thereto, and, thus, the encoder 120 may have more or fewer components than the components listed above.

The partitioning unit 121 may divide the current frame (CF in FIG. 1) included in the input second data FI into a plurality of blocks. In this case, the plurality of blocks may include at least one block corresponding to the region of interest, and may include at least one block corresponding to the non-region of interest.

The partitioning unit 121 may determine whether each of the plurality of blocks is a block corresponding to the region of interest or whether each of the plurality of blocks is a block corresponding to the non-region of interest based on the interest region information stored in the first memory (140 in FIG. 1).

The prediction module 122 may perform at least one of intra prediction and inter prediction for the current frame of the input image. The intra prediction may be performed without referring to a frame other than the current frame, and the inter prediction may be performed by referring to a frame other than the current frame.

The prediction module 122 may generate residual block data by providing a block encoded through the intra prediction and/or a block encoded through the inter prediction to the adder 125.

The rate control module 124 may adjust the quantization parameter (QP) value for a subject (for example, block) to be quantized based on the interest region information stored in the first memory 140 (see FIG. 1).

For example, the rate control module 124 may determine the quantization parameter values of a block corresponding to the region of interest divided by the partitioning unit 121 and a block corresponding to the non-region of interest divided by the partitioning unit 121 such that the quantization parameter values are different from each other. Here, the quantization parameter value of the block corresponding to the non-region of interest may be greater than the quantization parameter value of the block corresponding to the region of interest.

The compression module 123 may include a transform module 123a, a quantization unit 123b, an inverse quantization unit 123c, and an inverse transform module 123d.

The compression module 123 may form compressed data by performing an encoding operation on the current frame based on the quantization parameter value of the block corresponding to the non-region of interest and the quantization parameter value of the block corresponding to the region of interest.

The transform module 123a may form block data transformed from the residual block data. The transform module 123a may use discrete cosine transform (DCT) or wavelet transform. The transform coefficients generated in the transform module 123a may be transmitted to the quantization unit 123b.

The quantization unit 123b may reduce the number of bits by quantizing the transform coefficients. In this procedure, the aforementioned rate control module 124 may modify the quantization degree by adjusting the quantization parameter values of the block corresponding to the region of interest and the block corresponding to the non-region of interest.

The inverse quantization unit 123c, the inverse transform unit 158, and the adder 127 may be used to decode loss-encoded data to recover a reconstructed image. The reconstructed image may be stored in the DPB 126 and used as a reference image.

The entropy encoding unit 128 may entropy-code the compressed data. For example, the entropy encoding unit 128 may use context-adaptive variable-length coding (CAVLC), context-adaptive binary arithmetic coding (CABAC), probability interval partitioning entropy (PIPE), and other entropy encoding techniques. Subsequently to the entropy encoding by the entropy encoding unit 128, an encoded bit stream (EN OUT) may be formed, and may be transmitted to a decoder or stored in the second memory (220 in FIG. 1).

For example, the encoding method of the encoder of FIG. 2 may be any one of HEVC, VP8, VP9, MPEG-2, MPEG-4, H.263, and H. 264. However, example embodiments are not limited thereto.

Figure 3:
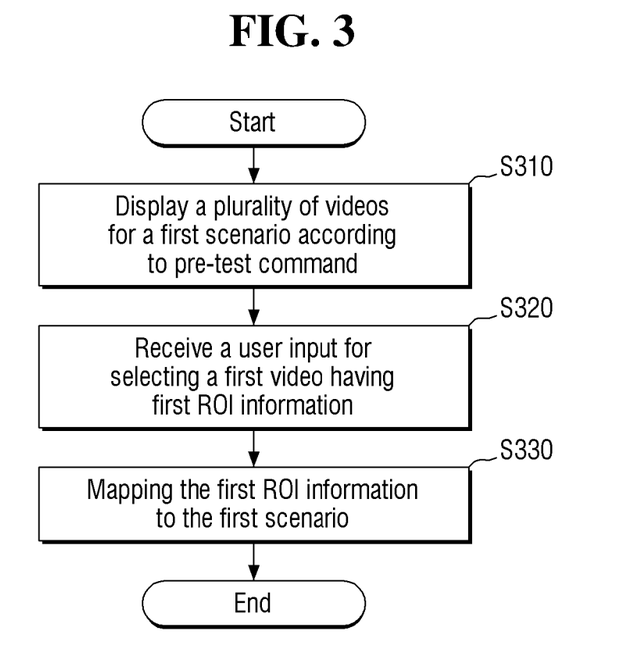
FIG. 3 is a flowchart illustrating a method of storing interest region information for each of a plurality of scenarios in a memory in the video encoding system according to an example embodiment.
Figure 4:
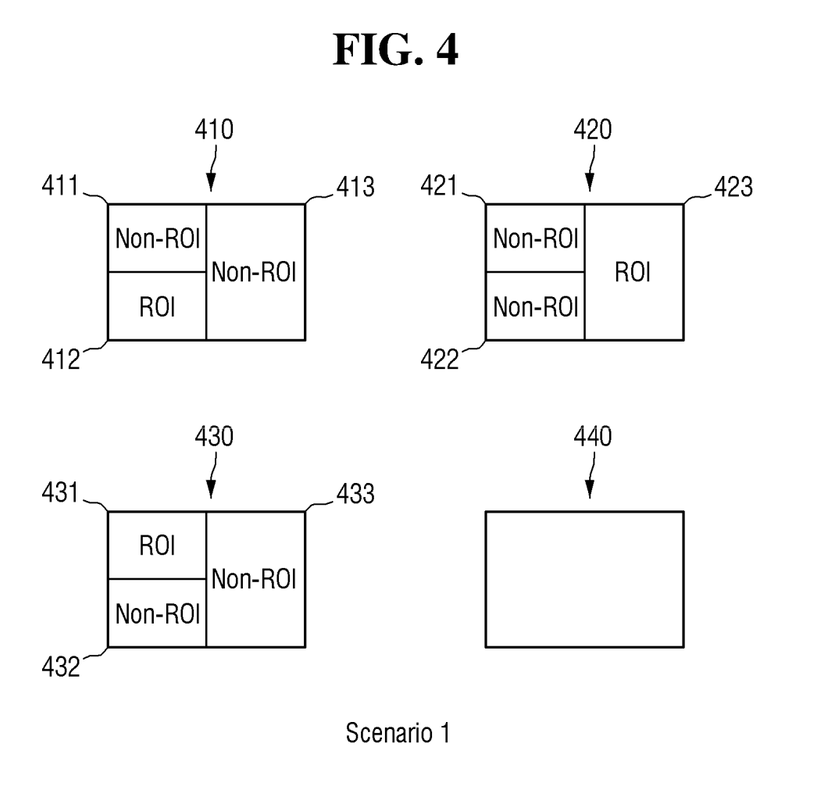
FIG. 4 is a view for explaining an example of the method of storing interest region information for each of a plurality of scenarios in a memory in the video encoding system according to an example embodiment.

FIG. 3 is a flowchart illustrating a method of storing interest region information for each of a plurality of scenarios in a memory in the video encoding system according to an example embodiment. FIG. 4 is a view for explaining an example of the method of storing interest region information for each of a plurality of scenarios in a memory in the video encoding system according to an example embodiment.

In relation with FIGS. 3 and 4, contents overlapping those having been described with reference to FIGS. 1 and 2 will not be repeated, and differences will be mainly described.

Referring to FIGS. 3 and 4, a plurality of images for each of a plurality of scenarios may be previously stored in the second memory 220. The plurality of images may be images where different pieces of interest region information are applied to the same image.

As an example, when the scenario is a scenario of photographing a person, the second memory 220 may store a first video having improved image quality in a region including a person, a second video having improved image quality in a region including no person, and a third video having the same image quality in all regions. Here, the first video may have interest region information about an region of interest in which a person is included, the second video may have interest region information about an region of interest in which a person is not included, and the third video may have interest region information about an region of interest which was not set.

As another example, when the scenario is a scenario of photographing a building, the second memory 220 may store a first video having improved image quality in a region including a building, a second video having improved image quality in a region including no building, and a third video having the same image quality in all regions. Here, the first video may have interest region information about an region of interest in which a building is included, the second video may have interest region information about an region of interest in which a building is not included, and the third video may have interest region information about an region of interest which was not set.

Referring to FIG. 3, in operation S310, the display 200 may display a plurality of images for the first scenario among the plurality of images stored in the second memory 220 according to a pre-test command. The pre-test command may be a command that is performed by allowing a user to select a specific menu, or may be a command that is executed through the input of the user in the initial setting menu.

For example, referring to FIG. 4, the display 200 may display a plurality of images for the first scenario stored in the second memory 220 together according to the pre-test command. Here, when the first scenario is a scenario of photographing a building and a person, the display 200 may display a first video 410 having improved image quality of a region including a building stored in the second memory 220, a second video 420 having improved image quality of a region including a person, a third video 430 having improved image quality of a region not including a person and a building, and a fourth video in which the same image quality is applied to all regions, together.

The first video 410 may be a video having first interest region information. For example, the first interest region information may be information of setting a region including a building as the region of interest.

The second video 420 may be a video having second interest region information. For example, the second interest region information may be information of setting a region including a person as the region of interest.

The third video 430 may be a video having third interest region information. For example, the third interest region information may be information of setting a region not including a person and a building as the region of interest.

The fourth video 440 may be a video having fourth interest region information. For example, the fourth interest region information may be information of not setting the region of interest.

Referring to FIG. 3 again, in operation S320, the input device 210 may receive a user input for selecting any one video from the plurality of displayed videos through the display 200. For example, the input device 210 may receive a user input for selecting a first video having first interest region information shown in FIG. 4

In operation S330, the processor 130 may map the first interest region information (for example, information of setting a region including a building as the region of interest) for the first scenario (for example, scenario of photographing a building and a person) based on the user input for selecting the first video 410 shown in FIG. 4, and may store the mapped first interest region information.

If a user selects a video (for example, second video 420) other than the first video 410 shown in FIG. 4, the processor 130 may map the interest region information (for example, second interest region information) included in the selected video for the first scenario, and may store the mapped interest region information.

After the interest region information for the first scenario is stored in the first memory 140, a procedure of displaying a plurality of videos corresponding for the second scenario different from the first scenario is repeated, so as to store the interest region information for the second scenario in the first memory 140.

As a result, the image encoding system 10 displays the plurality of videos for each of the plurality of scenarios, and selects and receives an image recognized as the best image quality from a user, thereby storing the interest region information for each of the plurality of scenarios in the first memory 140.

Figure 5:
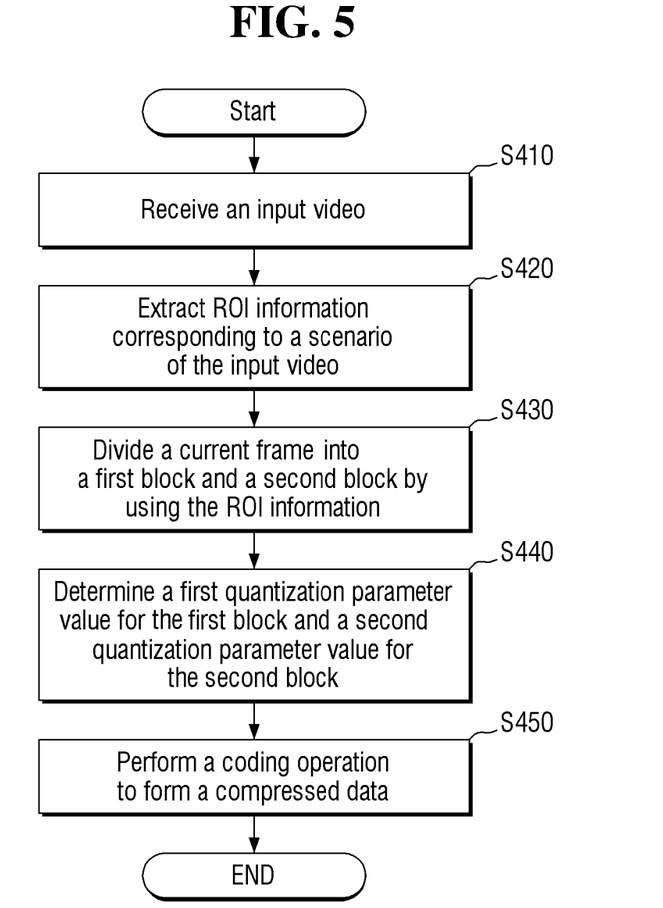
FIG. 5 is a flowchart illustrating a process of encoding an image in the video encoding system according to an example embodiment.
Figure 6:
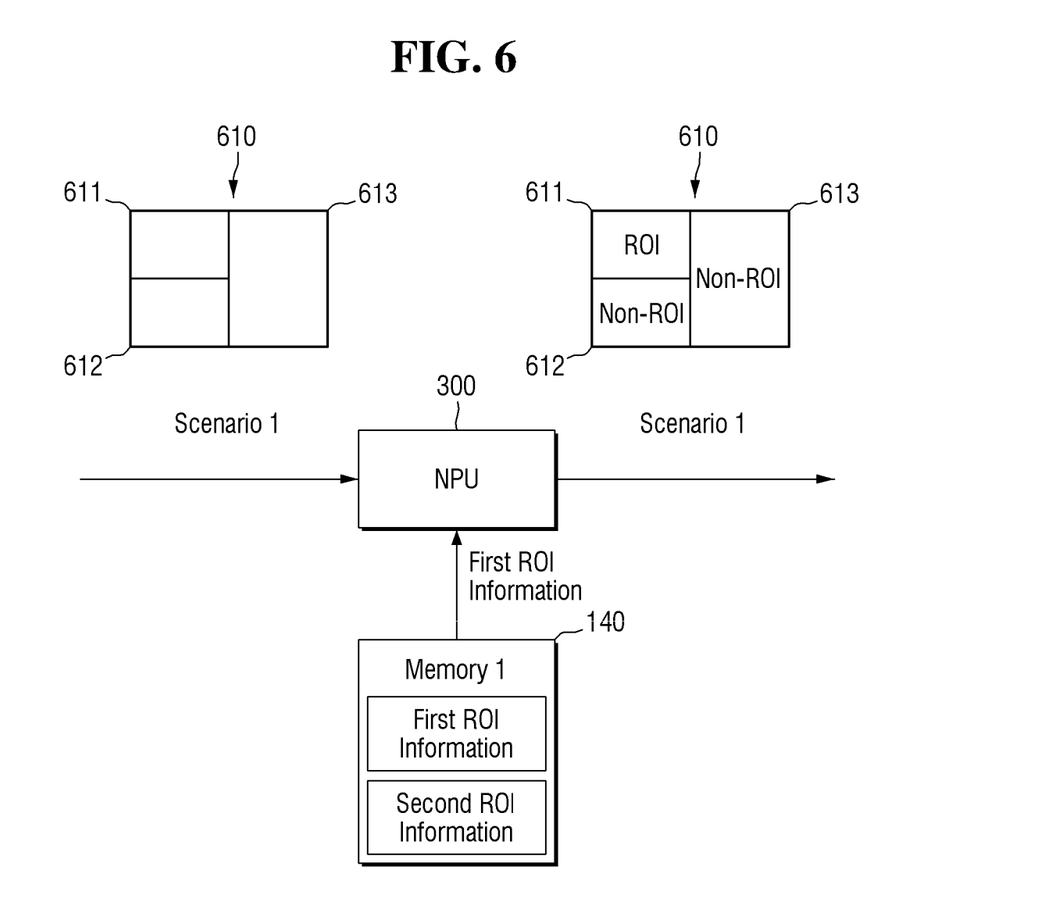
FIG. 6 is a view for explaining examples of a method of dividing an region of interest and a non-region of interest in the encoder according to an example embodiment.
Figure 7:
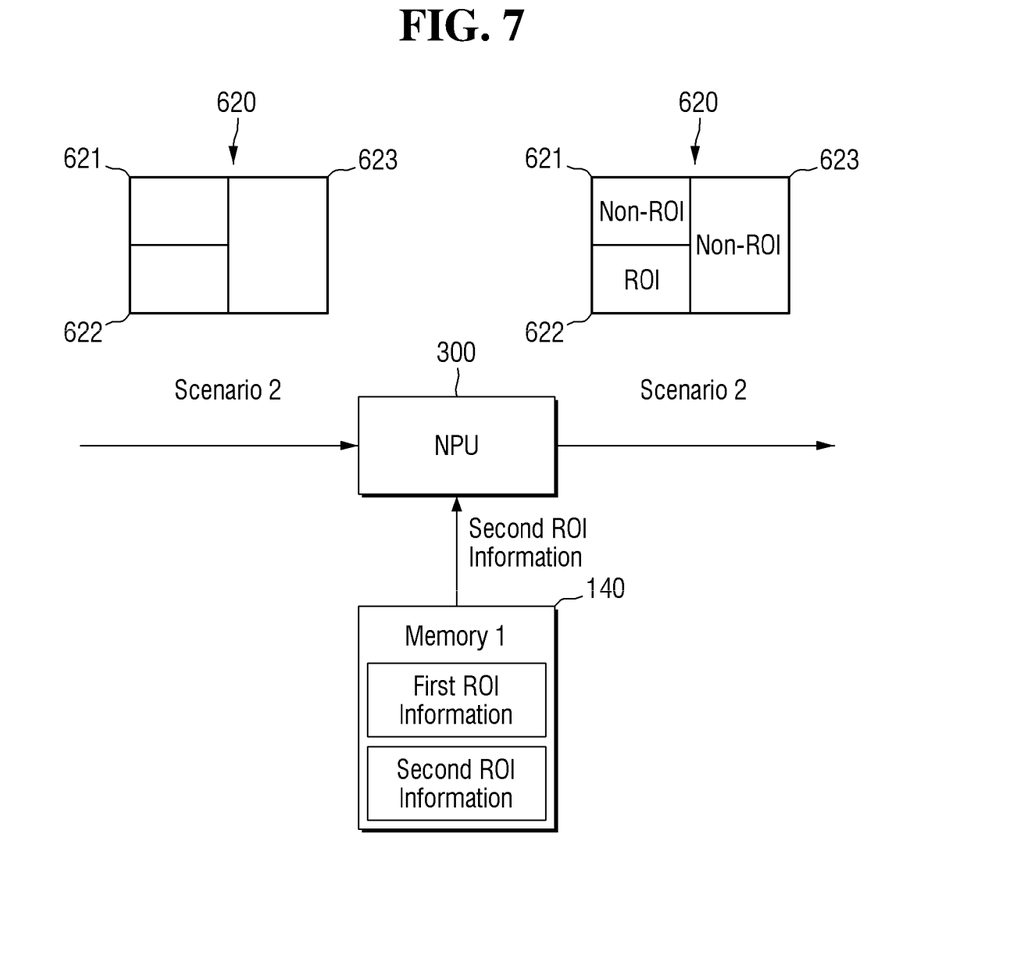
FIG. 7 is a view for explaining examples of a method of dividing an region of interest and a non-region of interest in the encoder according to another example embodiment.

FIG. 5 is a flowchart illustrating a process of encoding an image in the video encoding system according to an example embodiment. FIGS. 6 and 7 are views for explaining examples of a method of dividing an region of interest and a non-region of interest in the encoder according to some example embodiments. In relation with FIGS. 5 to 7, contents overlapping those having been described with reference to FIGS. 1 to 4 will not be repeated, and differences will be mainly described.

For the convenience of explanation, hereinafter, in relation with FIGS. 5 to 7, example embodiments will be described, assuming that the first interest region information of setting a region including a building as the region of interest for the first scenario (for example, scenario of photographing a building and a person) is mapped and stored in the first memory 140, and the second interest region information of setting a region including a flower as the region of interest for the second scenario (for example, scenario of photographing a building and a flower) is mapped and stored in the first memory 140. Further, example embodiments will be described, assuming that only the first interest region information for the first scenario and the second interest region information for the second scenario are stored in the first memory 140.

Referring to FIG. 5, in operation S410, the video source 50 included in the video encoding system 10 may receive an input video.

In operation S420, the NPU 300 included in the video encoding apparatus 100 may recognize the scenario of the input video, and may extract the interest region information corresponding to the scenario of the input video from the first memory 140.

In operation S430, the partitioning unit 121 may divide the current frame included in the input video into a plurality of frames. For example, the partitioning unit 121 may divide a plurality of blocks included in the current frame into a first block corresponding to the region of interest (ROI) and a second block corresponding to the non-region of interest (non-ROI).

As an example, referring to FIG. 6, when the first region 611 of the current frame 610 includes a building, the second region thereof 612 includes a person, and the third region thereof 613 does not include a building and a person, the NPU 300 may recognize the current frame 610 as a frame corresponding to the first scenario. The NPU 300 may extract the first interest region information corresponding to the first scenario from the first memory 140. Further, the partitioning unit 121 may set at least one first block included in the first region 611 as an region of interest (ROI) and may set at least one second block included in the second region 612 and third region 613 in the current frame 610 as an non-region of interest (non-ROI), based on the first interest region information.

As another example, referring to FIG. 7, when the first region 621 of the current frame 620 includes a building, the second region thereof 622 includes a flower, and the third region thereof 623 does not include a building and a flower, the NPU 300 may recognize the current frame 620 as a frame corresponding to the second scenario. The NPU 300 may extract the second interest region information corresponding to the second scenario from the first memory 140. Further, the partitioning unit 121 may set at least one first block included in the second region 622 as an region of interest (ROI) and may set at least one second block included in the first region 621 and third region 623 in the current frame 620 as an non-region of interest (non-ROI), based on the second interest region information corresponding to the second scenario.

According to some example embodiments, in a state where interest region information (for example, first interest region information and second interest region information) for each of a plurality of scenarios is stored in the first memory 140, an input video of a scenario not included in the plurality of scenarios stored in the first memory 140 may be received through the video source 50. In this case, when the scenario of the input video is not included in the plurality of stored scenarios, the input video may not be divided into an region of interest and a non-region of interest. That is, the partitioning unit 121 divides the current frame into a plurality of blocks, but may not divide the plurality of blocks into a block corresponding to the region of interest and a block corresponding to the non-region of interest.

According to some example embodiments, in a state where interest region information (for example, first interest region information and second interest region information) for each of a plurality of scenarios is stored in the first memory 140, when an input video of a scenario not included in the plurality of scenarios is received through the video source 50, the partitioning unit 121 may set a block corresponding to a region including a specific object (for example, a face) as a block corresponding to the region of interest, and may also set a block corresponding to a region not including the specific object as a block corresponding to the non-region of interest.

According to some example embodiments, in a state where interest region information (for example, first interest region information and second interest region information) for each of a plurality of scenarios is stored in the first memory 140, when an input video of a scenario not included in the plurality of scenarios is received through the video source 50, the partitioning unit 121 may set a block having a texture value less than a desired (or, alternatively, a preset) texture value as a block corresponding to the region of interest, and may also set a block excluding a block corresponding to the region of interest among the plurality of blocks.

Referring to FIG. 5 again, in operation S440, the rate control module 124 may determine the first quantization parameter value of the first block corresponding to the region of interest and the second quantization parameter value of the second block corresponding to the non-region of interest. Here, the first quantization parameter value may be greater than the second quantization parameter value.

In operation S450, the compression module 123 may form compressed data by performing an encoding operation on the current frame using the first quantization parameter value and the second quantization parameter value.

According to some example embodiments, after the compressed data is formed, the entropy encoding unit 128 may entropy-code the compressed data to form a bit stream. The bit stream formed by the entropy encoding unit 128 may be stored in the second memory 220.

According to some example embodiments, the NPU 300 may update the interest region information stored in the first memory 140 based on the user input. Details thereof will be described with reference to FIGS. 8 to 10.

Figure 8:
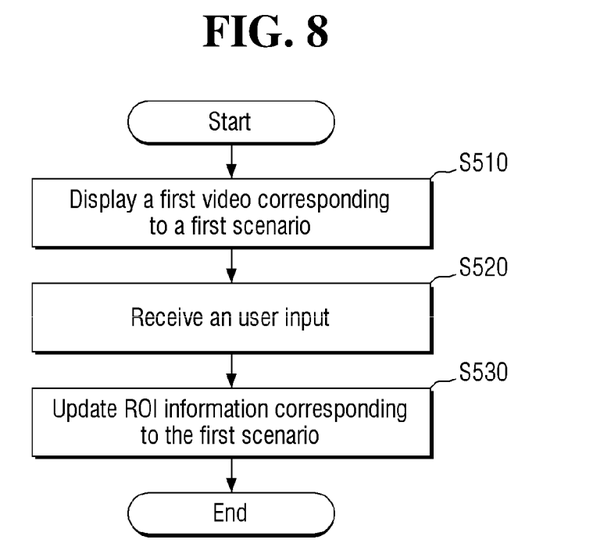
FIG. 8 is a flowchart illustrating a method of updating interest region information stored in a first memory based on a user input in the video encoding system according to an example embodiment.
Figure 9:
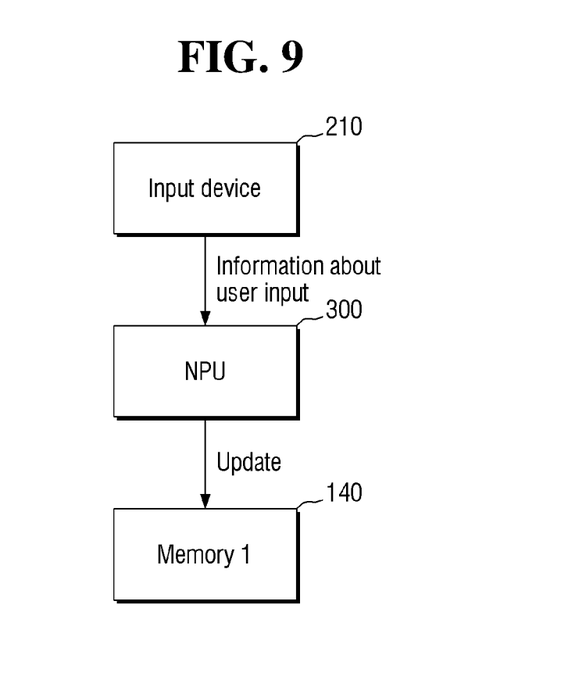
FIG. 9 is a view for explaining an example of the method of updating interest region information stored in a first memory based on a user input in the video encoding system according to an example embodiment.

FIG. 8 is a flowchart illustrating a method of updating interest region information stored in a first memory based on a user input in the video encoding system according to an example embodiment. FIG. 9 is a view for explaining an example of the method of updating interest region information stored in a first memory based on a user input in the video encoding system according to an example embodiment. In relation with FIGS. 8 and 9, contents overlapping those having been described with reference to FIGS. 1 to 8 will not be repeated, and differences will be mainly described.

Referring to FIG. 8, in operation S510, the display 200 may display a video corresponding to a first scenario. Here, the video displayed on the display 200 may be a video in which the bit stream stored in the second memory 220, described in FIG. 5, is decoded. For the convenience of explanation, example embodiments will be described, assuming that the first interest region information is mapped in the first scenario.

In operation S520, the input device 210 may receive a user input in a state where a video corresponding to the first scenario is displayed.

As an example, the user input may be an input by a user to gaze at a region within a video displayed when the video corresponding to the first scenario is displayed.

As another example, the user input may be a touch input of a user selecting a region within a video displayed when the video corresponding to the first scenario is displayed.

As another example, the user input may be an input of a user enlarging or reducing a region within a video displayed when the video corresponding to the first scenario is displayed.

In operation S530, the NPU 300 may update the first interest region information corresponding to the first scenario based on the user input.

As an example, referring to FIG. 9, the input device 210 may receive a user input for a region within a video displayed when the video corresponding to the first scenario is displayed (for example, an input for touching, enlarging or reducing a region within a video displayed). In this case, the input device 210 may transmit information about the user input to the NPU 300. The NPU 300 may recognize information about the region where the user input is sensed based on the information on the user input. Further, the NPU 300 may update the first interest region information mapped in the first scenario based on the recognized information. For example, when the region where the user input is sensed is a region including a person, the NPU 300 may update (modify) the first interest region information such that the region including the person is the region of interest.

As another example, although not shown in the drawings, the input device 210 may transmit information about a user's eyes gazing at a region within a video displayed when the video corresponding to the first scenario is displayed to the NPU 300. The NPU 300 may recognize the information about the region where the user's eyes stay in the video based on the received information. Further, the NPU 300 may update the first interest region information mapped in the first scenario based on the recognized information. For example, when the region where the user's eyes stay in the video is a region including the person, the NPU 300 may update (modify) the first interest region information such that the region including the person is the region of interest.

That is, the NPU 300 may update the interest region information by analyzing and learning the behavior pattern of a user.

Figure 10:
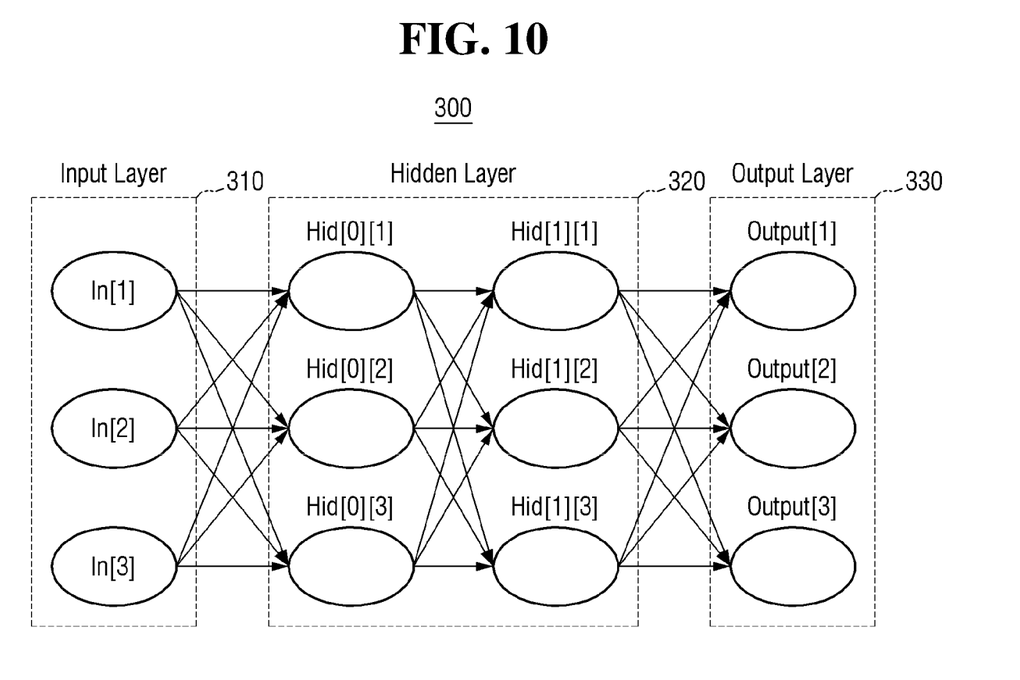
FIG. 10 is a schematic view for explaining a configuration of NPU according to an example embodiment.

FIG. 10 is a schematic view for explaining a configuration of NPU according to an example embodiment.

According to some example embodiments, the NPU 300 may include an input layer 310, a hidden layer 320, and an output layer 330. However, example embodiments are not limited to this, and the NPU 300 may have another configuration.

The input layer 310 may be a layer receiving data, and the input video converted into data may be input to the input layer 310.

The hidden layer 320 may be a layer that is appropriately adjusted according to the correlation between the input layer 310 and the output layer 330. The hidden layer 320 may be a layer for distributing and storing the weighted value multiplied by input data using the interest region information. The interest region information stored in the first memory 140 may be information about the weighted value multiplied by the input data.

The output layer may include information about trained results.

The NPU 300 may multiply the input data by the weighted value included in the hidden layer 320 to output a resultant value. At this time, output data may be different from the given target output value. In this case, the NPU 300 may update the weighted values in the hidden layer 320 using the error between the target output value and the current output value.

Consequently, the NPU 320 can discover and learn the pattern and characteristics of a user setting the region of interest by continuously updating the weighted values in the hidden layer 320. The information learned through the NPU 300 may be stored in the first memory 140 as the interest region information.

Although some example embodiments have been disclosed for illustrative purposes, those skilled in the art will appreciate that various modifications, additions and substitutions are possible, without departing from the scope and spirit of the accompanying claims.

The example embodiments have been described with reference to the attached drawings, but it may be understood by one of ordinary skill in the art that the present disclosure may be performed one of ordinary skill in the art in other specific forms without changing the technical concept or essential features of the present disclosure. Further, the above-described example embodiments are merely examples and do not limit the scope of the rights of the present disclosure.

As discussed above, the various operations of methods described above may be performed by any suitable means capable of performing the operations, such as various hardware and/or software component(s), circuits, and/or module(s).

The software may include an ordered listing of executable instructions_for implementing logical functions, and can be embodied in any "processor-readable medium" for use by or in connection with an instruction execution system, apparatus, or device, such as a single or multiple-core processor or processor-containing system.

The operations of a method or algorithm and functions described in connection with the example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

What is claimed is:

1. A video encoding apparatus, comprising:
a memory configured to store interest region information for each of a plurality of scenarios; and a processor configured to, encode a current frame of an input video received from the memory to generate compressed data by,
recognizing a scenario in the input video from among a plurality of scenarios, the scenario including a region of interest (ROI) and a non-region of interest (non-ROI) set based on the interest region information,
in response to the scenario in the input video being recognized, extracting the interest region information corresponding to the scenario recognized in the input video from among the plurality of scenarios,
in response to the scenario in the input video not being recognized, setting a block among a plurality of blocks included in the current frame having a texture value less than a set value as a first block corresponding to the ROI, and setting a block excluding the first block among the plurality of blocks as a second block corresponding to the non-ROI, and
encoding the current frame based on the ROI and the non-ROI set for the scenario to generate the compressed data; and
updating the interest region information stored in the memory based on a user input by,
displaying the input video based on a first one of the interest region information for the scenario,
receiving the user input selecting a second one of the interest region information for the scenario,
mapping the second one of the interest region information for the scenario to the input video based on the user input, and storing the second one of the interest region information in the memory.

2. The video encoding apparatus of claim 1, wherein the processor is further configured to,
divide the current frame included in the input video into the plurality of blocks,
divide the plurality of blocks into the first block corresponding to the ROI and the second block corresponding to the non-ROI based on the interest region information,
determine a first quantization parameter value for the first block and a second quantization parameter value for the second block; and
encode the current frame based on the first quantization parameter value and the second quantization parameter value to generate the compressed data.

3. The video encoding apparatus of claim 1, wherein the processor is configured to extract the interest region information by,
extracting the second one of the interest region information mapped for scenario, if the input video corresponds to the scenario.

4. The video encoding apparatus of claim 1, wherein the processor is configured to,
receive the user input selecting the second one of the interest region information for the scenario based on at least one of user gaze information and user input information.

5. A video encoding apparatus, comprising:
a memory configured to store interest region information for each of a plurality of scenarios; and
a processor configured to,
recognize a scenario in the input video from among of the plurality of scenarios, the scenario including a region of interest (ROI) and a non-region of interest (non-ROI) set based on the interest region information,
in response to the scenario in the input video being recognized, extract, from the memory, the interest region information corresponding to the scenario recognized in the input video from among the plurality of scenarios, divide a current frame included in the input video into a plurality of blocks, and divide the plurality of blocks into a first dock corresponding to the ROI and a second block corresponding to the non-ROI based on the interest region information, in response to the scenario in the input video not being recognized, set a block among the plurality of blocks included in the current frame having a texture value less than a set value as the first block corresponding to the ROI, and set a block excluding the first block among the plurality of blocks as the second block corresponding to the non-ROI, determine a first quantization parameter value for the first block and a second quantization parameter value for the second block, encode the current frame based on the first quantization parameter value and the second quantization parameter value to generate compressed data, and update the interest region information stored in the memory based on a user input by, displaying the input video based on a first one of the interest region information for the scenario, receiving the user input selecting a second one of the interest region information for the scenario, mapping the second one of the interest region information for the scenario to the input video based on the user input, and storing the second one of the interest region information in the memory.

6. The video encoding apparatus of claim 5, wherein the processor is configured to, extract the second one of the interest region information mapped in the scenario, if the input video corresponds to the scenario, and determine the first block and the second block based on the second one of the interest region information.

7. A video encoding system, comprising: a video source configured to transmit an input video; a video encoding apparatus including, a first memory configured to store interest region information for each of a plurality of scenarios, and a processor configured to, recognize a scenario in the input video from among the plurality of scenarios, the scenario including a region of interest (ROI) and a non-region of interest (non-ROI) set based on the interest region information, in response to the scenario in the input video being recognized, extract, from the first memory, the interest region information corresponding to the scenario recognized in the input video from among the plurality of scenarios, divide a current frame included in the input video into a plurality of blocks, and divide the plurality of blocks into a first block corresponding to the ROI and a second block corresponding to the non-ROI based on the interest region information, in response to the scenario in the input video not being recognized, set a block among the plurality of blocks included in the current frame having a texture value less than a set value as the first block corresponding to the ROI, and set a block excluding the first block among the plurality of blocks as the second block corresponding to the non-ROI, determine a first quantization parameter value for the first block and a second quantization parameter value for the second block, encode the current frame based on the first quantization parameter value and the second quantization parameter value to generate compressed data, and update the interest region information stored in the memory based on a user input by, displaying the input video based on a first one of the interest region information for the scenario, receiving the user input selecting a second one of the interest region information for the scenario, mapping the second one of the interest region information for the scenario to the input video based on the user input, and storing the second one of the interest region information in the memory and a second memory configured to store a bit stream, the bit stream being entropy-encoded based on the compressed data.

8. The video encoding system of claim 7, wherein the second memory is configured to, store a first video having the first one of the interest region information associated with the scenario, and store a second video having the second one of the interest region information associated with the scenario.

9. The video encoding system of claim 8, further comprising:

a display device configured to display the first video and the second video stored in the second memory according to a pre-test command.

10. The video encoding system of claim 9, wherein the processor is configured to, extract the second one of the interest region information mapped in the scenario, if the input video corresponds to the scenario, and determine the first block and the second block based on the second one of the interest region information.

11. The video encoding system of claim 7, wherein the first memory is configured to store the first one of the interest region information and the second one of the interest region information, the second memory is configured to store a first video having the first one of the interest region information associated with the scenario, and a second video having the second one of the interest region information associated with the scenario, and the processor is configured to select the second interest region information based on at least one of user gaze information for the second video and user input information for the second video when displaying the second video.

* * * * *